United States Patent [19]

Agrawal

[11] Patent Number: 5,634,723
[45] Date of Patent: Jun. 3, 1997

[54] HYDRODYNAMIC FLUID FILM BEARING

[75] Inventor: Giridhari L. Agrawal, Simsbury, Conn.

[73] Assignee: R & D Dynamics Corporation, Bloomfield, Conn.

[21] Appl. No.: 633,898

[22] Filed: Apr. 17, 1996

Related U.S. Application Data

[63] Continuation-in-part of Ser. No. 490,976, Jun. 15, 1995, abandoned.

[51] Int. Cl.$^6$ .................................................. F16C 32/06
[52] U.S. Cl. ........................................ 384/106; 384/103
[58] Field of Search .................................. 384/103, 106, 384/114

[56] References Cited

U.S. PATENT DOCUMENTS

| | | | |
|---|---|---|---|
| 3,366,427 | 1/1968 | Silver et al. | 384/103 |
| 3,382,014 | 5/1968 | Marley | 384/106 |
| 3,511,544 | 5/1970 | Marley | 384/12 |
| 3,615,121 | 10/1971 | Barnett et al. | 384/103 |
| 3,635,534 | 1/1972 | Barnett | 384/106 |
| 3,809,443 | 5/1974 | Cherubim | 384/106 |
| 4,153,315 | 5/1979 | Silver et al. | 384/106 |
| 4,178,046 | 12/1979 | Silver et al. | 384/106 |
| 4,195,395 | 4/1980 | Silver et al. | 29/898.02 |
| 4,348,066 | 9/1982 | Agrawal et al. | 384/124 |
| 4,415,280 | 11/1983 | Agrawal | 384/103 |
| 4,415,281 | 11/1983 | Agrawal | 384/103 |
| 5,116,143 | 5/1992 | Saville et al. | 384/106 |
| 5,228,785 | 7/1993 | Saville et al. | 384/106 X |

FOREIGN PATENT DOCUMENTS

| | | | |
|---|---|---|---|
| 490443 | 6/1992 | European Pat. Off. | 384/114 |
| 160619 | 9/1983 | Japan | 384/103 |
| 197614 | 11/1984 | Japan | 384/103 |

*Primary Examiner*—Thomas R. Hannon
*Attorney, Agent, or Firm*—Victor E. Libert

[57] ABSTRACT

A hydrodynamic fluid film bearing has a stationary retaining member (12) having a cylindrical opening (14) to receive for rotation therein a rotatable shaft (16). The inner surface (20) of the opening (14) is lined by a generally cylindrical-shaped foil assembly (18) comprised of a plurality of foil sub-assemblies (24) each comprised of spring foils (26), contact foils (30) and, optionally, inner foils (32). Each foil sub-assembly (24) subtends a rotational segment, less than all, of the inner surface (20), e.g., from about 45 degrees to 120 degrees of rotation. The spring foils (26) and contact foils (30) are affixed to the retaining member (12) in such a way that sliding travel of the spring foils (26) along the inner surface (20) is in the opposite rotational direction of sliding travel of the contact foils (30) along the inner surface (20). The foil sub-assemblies (24) may be affixed to the retaining member (12) by means of keyways (22a–22e) within which the foil sub-assemblies (24) are mounted.

19 Claims, 6 Drawing Sheets

HYDRODYNAMIC FLUID FILM BEARING

CROSS-REFERENCE TO RELATED APPLICATION

This application is a continuation-in-part of patent application Ser. No. 08/490,976, filed Jun. 15, 1995, now abandoned in the name of Giridhari L. Agrawal, and entitled "Improved Hydrodynamic Fluid Film Bearing".

BACKGROUND OF THE INVENTION

1. Field of the Invention

This invention relates generally to hydrodynamic fluid film bearings and, more particularly, to such bearings employing a plurality of thin foils lining the inner surface of a retaining member within which a high-speed rotating shaft is receivable, to establish and maintain a lubricating fluid film, e.g., air, between the foils and the rotating shaft.

2. Related Art

Recent efforts have been made to improve bearings for high speed rotating machinery, such as turbocompressors employed in modern air cycle machines for aircraft cooling and ventilation. Such efforts have led to the development of numerous designs for fluid film hydrodynamic bearings. Generally, fluid film hydrodynamic bearings have been successfully employed in high-speed rotating machines for about the past twenty years. For example, air cycle machines used for aircraft cabin environment control systems utilize fluid film hydrodynamic bearings. Such bearings operate on the principle that a high speed rotating member, such as a shaft, is at least slightly eccentric with respect to rotation about its longitudinal axis. Therefore, if the shaft is enclosed by a close-fitting, compliant, annular element such as a thin foil encased within a stationary retaining member, the eccentricity of rotation within such retaining member will form and maintain a pressurized fluid (e.g., air) film wedge between the shaft and the compliant foil. The high speed rotation of the shaft generates a high pressure in the fluid film wedge, which fluid film supports the load imposed by the shaft. A spring foil, i.e., a resilient backing member, is disposed between the compliant foil and the stationary member (sometimes referred to as a cartridge, retainer or base) to accommodate deflections of the foil resulting from pressurization, centrifugal forces and temperature differentials in order to maintain optimum or at least adequate film layer geometry. The fluid film hydrodynamic bearing desirably has high load capacity and high coulomb damping for suppression of shaft whirl. Providing such characteristics has typically required stringent control of manufacturing tolerances of the fluid film hydrodynamic bearing.

One type of known fluid film hydrodynamic bearing is a multi-pad type as described in U.S. Pat. No. 3,615,121 to Barnett et al and U.S. Pat. Nos. 4,153,315, 4,178,046 and 4,195,395 to Silver et al. Generally, coulomb damping, which is required to suppress whirl of the shaft, is low for such multi-pad bearings, and the low damping has limited the utilization of such bearings. The multi-pad bearings have an iris-type construction and the three aforementioned patents to Silver et al show stiffener elements for the foils. U.S. Pat. No. 4,178,046 discloses a foil bearing in which a plurality of foils is mounted within the retaining member or bushing, each subtending a rotational segment, less than all, of the circumferential or inner surface of the bearing. Each foil is mounted at its midpoint with one side or wing of the foil serving as an underfoil for the overfoil of an adjacent member and the other arm or wing serving as an overfoil for the underfoil of an adjacent member on its opposite side. However, the arrangement of the foils is such that the sliding travel or shifting of adjacent foils (which results from the forces imposed on the foils by the pressurized fluid film generated by the rotating shaft) is in the same direction. Consequently, the relative sliding travel between adjacent foils is the difference between the amount of sliding travel of each foil. This limited relative foil movement contributes to the low coulomb damping characteristic of these multi-pad bearings. Often, in order to compensate for such limited coulomb damping, the art provides multi-pad bearing foils having a preformed diameter (the foil diameter prior to insertion of the shaft into the bearing) which is up to 50% less than the diameter of the shaft which is to be received in the bearing. Consequently, when the shaft is initially mounted within the bearing, the bearing foils maintain a relatively tight grip on the shaft. This results in a high preloading on the shaft and thereby requires a high starting torque. If any type of contaminant, such as water, is present in the bearing, a still higher starting torque is required. Such high starting torque is of course disadvantageous as it stresses the machine which is being used to drive the shaft and may be severe enough to result in inability to start the engine or motor which drives the shaft and/or cause damage to the engine or motor or to drive components.

Improved bearings were provided by the reverse 360-degree multi-layer hydrodynamic fluid film foil bearings described in U.S. Pat. Nos. 4,415,280 and 4,415,281 issued to G. L. Agrawal. In these bearings, two layers of flat compliant foils are arranged to shift in opposite rotational directions and are supported on a layer of corrugated foil which serves as a spring foil and provides high load capacity. Due to the fact that adjacent foils shift in opposite directions, coulomb damping is relatively high because the relative movement between adjacent foils is equal to the sum of the individual foil movements. Accordingly, adequate coulomb damping is attained without the necessity of reducing the preformed radius of the foils to significantly less than that of the shaft. Consequently, preloading imposed on the shaft by the foils is small and the starting torque required is not significantly increased by the bearing. However, because the foils are supported at only one end thereof and extend for 360-degrees around the entire circumference of the inner surface of the stationary member, the foils of these otherwise successful bearings occasionally telescope during assembly and operation. If the foils should telescope during operation, the telescoped foils tighten around the shaft and bind it, and the bearing fails. Further, manufacture of such 360-degree foils is expensive as it requires extensive hand operations to hold the required tolerances.

Hydrodynamic fluid film foil bearings of conical configuration which can serve as thrust bearings to sustain axial loads, that is, loads imposed parallel to the longitudinal axis of the shaft supported by the bearing, are known in the art as evidenced by U.S. Pat. No. 3,382,014 issued to D. J. Marley. The Marley Patent shows in FIG. 2 thereof the overlapping foils of a truncated cone-shaped foil assembly (21) received within a conical recess (19) formed in a bearing housing (17).

SUMMARY OF THE INVENTION

Generally, in accordance with the present invention, there is provided a hydrodynamic fluid film bearing which may be denominated a "reverse multi-pad bearing" and which overcomes the above-noted disadvantages of the known multi-pad bearings and 360-degree reverse multi-layer bearings. The reverse multi-pad bearing of the present invention is not subject to telescoping failure, exhibits a high coulomb damping friction, has a high load capacity, a small starting torque requirement, is resistant to the presence of contaminants in the bearing and can be easily manufactured at low cost relative to the 360-degree reverse multi-layer bearings.

Specifically, in accordance with the present invention there is provided a hydrodynamic fluid film bearing comprising the following components. A retaining member has an inner surface, e.g., a cylindrical or conical-shaped inner surface, which defines a shaft opening within which a rotatable shaft is receivable for rotation. A foil assembly lines the inner surface and comprises a plurality of foil sub-assemblies, the foil sub-assemblies each subtending a rotational segment, less than all, of the inner surface. The foil sub-assemblies comprise compliant contact foils disposed in overlying contact with spring foils which are disposed radially outwardly of their associated contact foils. The spring foils and the contact foils are affixed to the retaining member in respective opposite-facing rotational directions along the inner surface. With this arrangement, sliding travel of the spring foils is in the opposite rotational direction of sliding travel of the contact foils.

In accordance with another aspect of the present invention, there is provided a hydrodynamic fluid film bearing comprising the following components. A retaining member has an inner surface, e.g., a cylindrical- or conical-shaped inner surface, which defines a shaft opening within which a rotatable shaft is receivable for rotation. A foil assembly is affixed to and lines the inner surface and comprises a plurality of foil sub-assemblies, the sub-assemblies each subtending a rotational segment, less than all, of the inner surface. The foil sub-assemblies comprise (i) compliant contact foils sandwiched between (ii) spring foils disposed radially outwardly of their associated contact foils and (iii) compliant inner foils disposed radially inwardly of their associated contact foils. The spring foils and the contact foils are affixed to the retaining member in respective opposite-facing rotational directions along the inner surface. With this arrangement, sliding travel of the spring foils is in the opposite rotational direction of sliding travel of the contact foils.

One aspect of the invention provides for the following construction. The spring foils have respective terminal proximal edges fixed to the retaining member and respective, opposite terminal distal edges facing in a first rotational direction along the inner surface. The contact foils are fixed to the retaining member and have respective distal edges facing in a second rotational direction opposite to the first rotational direction. With this arrangement, sliding travel of the spring foils is in the first rotational direction and sliding travel of the contact foils is in the second, opposite rotational direction.

Still another aspect of the present invention provides that the bearing further comprises a rotatable shaft received within the shaft opening to define between the shaft and the foil assembly an annular space dimensioned and configured so that a pressurized fluid film layer capable of supporting the shaft is maintainable therewithin.

Another aspect of the present invention provides that the retaining member has a longitudinal axis and the spring foil is corrugated, the corrugations being disposed substantially parallel to the longitudinal axis of the retaining member.

Other aspects of the present invention will become apparent from the following description and the appended drawings.

As used herein and in the claims, the following terms used in reference to the shape or configuration of the inner surface of the retaining member and the foil assembly, have the indicated meanings. The term "cylindrical" means a cylinder whose cross sections taken along planes perpendicular to the longitudinal axis of the cylinder are circles of equal size. Stated otherwise, in this context "cylindrical" means a regular, right angle circular cylinder. The term "conical" means a cone or truncated cone whose longitudinal axis is perpendicular to its base, i.e., a right-angle cone or truncated cone. The term "frusto-conical" refers specifically to a truncated conical configuration.

DETAILED DESCRIPTION OF THE INVENTION AND PREFERRED EMBODIMENTS THEREOF

Figure 1:
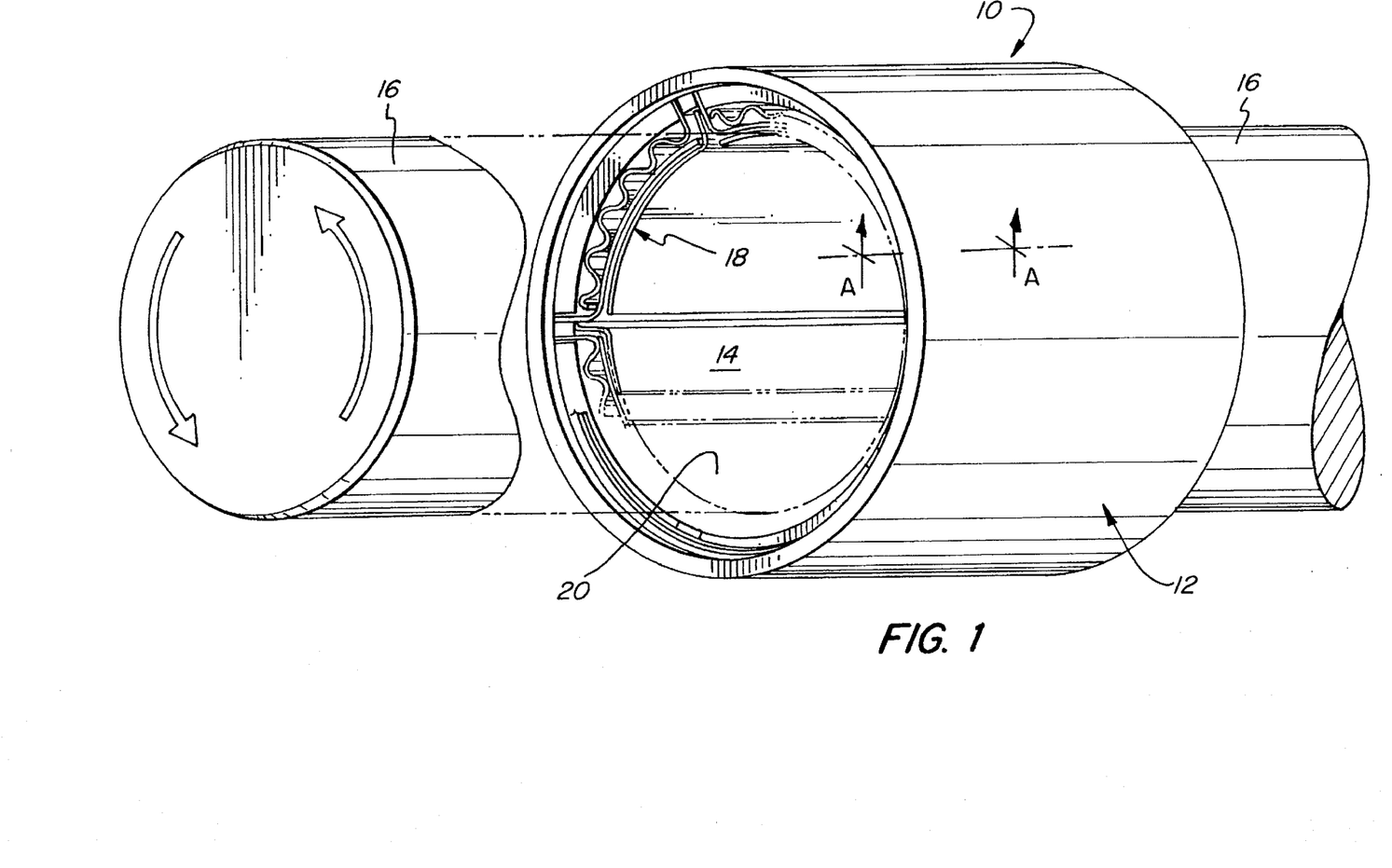
FIG. 1 is a schematic perspective view, with parts broken away or omitted, of a hydrodynamic bearing in accordance with one embodiment of the present invention, including a rotatable shaft received therein.

FIG. 1 shows a hydrodynamic fluid film bearing 10 comprising a cylindrical retaining member 12 which, in the illustrated embodiment, is of cylindrical configuration and defines a cylindrical opening 14 of circular, constant cross section within which a rotatable shaft 16 (partly broken away in FIG. 1) is received for rotation. A generally cylindrical-shaped foil assembly 18 (only partially shown in FIG. 1 and better seen in FIG. 2) lines the inner surface 20 of retaining member 12. A plurality of circumferentially spaced-apart keyways are formed in inner surface 20 and extend parallel to the longitudinal axis of cylindrical retaining member 12.

Figure 2:
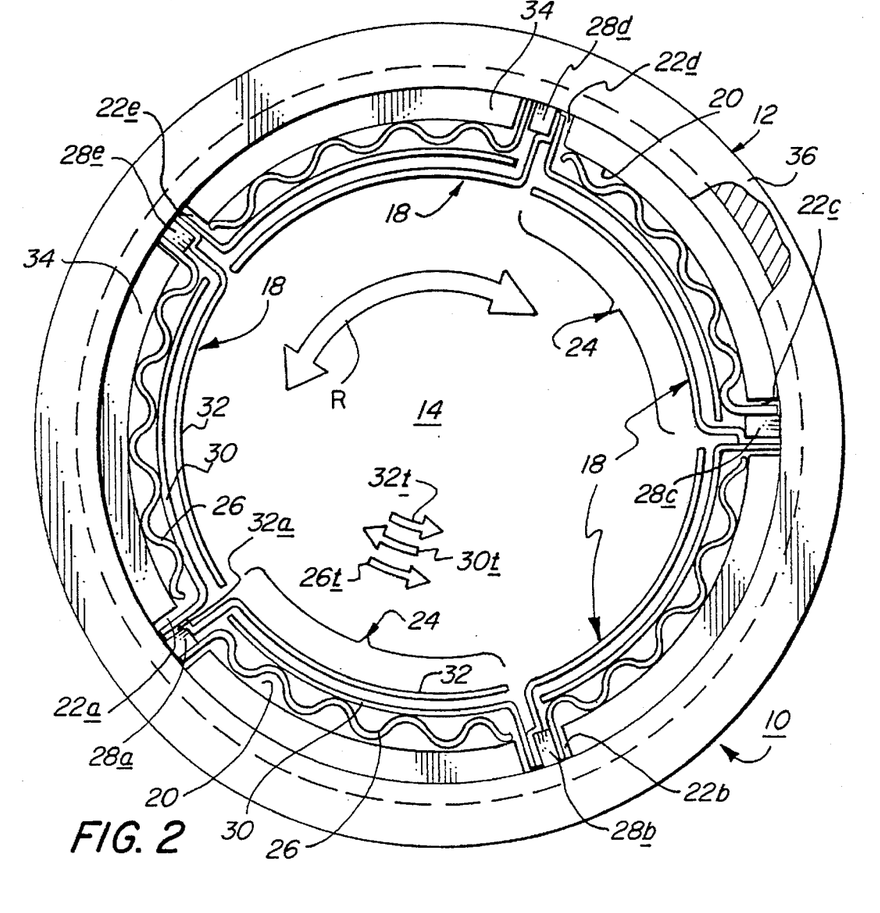
FIG. 2 is a schematic end view of the hydrodynamic bearing of FIG. 1 with the rotatable shaft omitted.

In the embodiment illustrated in FIG. 2, five identical keyways, 22a, 22b, 22c, 22d and 22e are formed in inner surface 20 and are equiangularly spaced apart about the circular cross-sectional circumference of cylindrical opening 14. A plurality, five in the embodiment of FIG. 2, of foil sub-assemblies 24 are affixed to retaining member 12 by means of the keyways 22a–22e and corresponding mounting bars 28a, 28b, 28c, 28d and 28e. As best seen in FIG. 2, each foil sub-assembly 24 subtends a rotational segment, less than all, of the inner surface 20. That is, each foil sub-assembly 24 overlies a portion, but less than all, of the 360-degree rotational travel path along the circumference of inner surface 20 of a point on the exterior surface of rotatable shaft 16. Inasmuch as the keyways 22a–22e are equiangularly spaced apart along the circumference of inner surface 20, each foil sub-assembly 24 subtends an equal sized rotational segment comprising, in the illustrated embodiment, one-fifth of 360-degrees of rotation, or a rotational segment of 72 degrees. Generally, it is preferred to provide at least three foil sub-assemblies, e.g., three to eight such sub-assemblies, to line the entire inner surface 20. Accordingly, each sub-assembly subtends not more than about 120 degrees of rotation, e.g., from about 45 degrees to 120 degrees of rotation, of the 360-degree rotational path along inner surface 20.

Figure 2A:
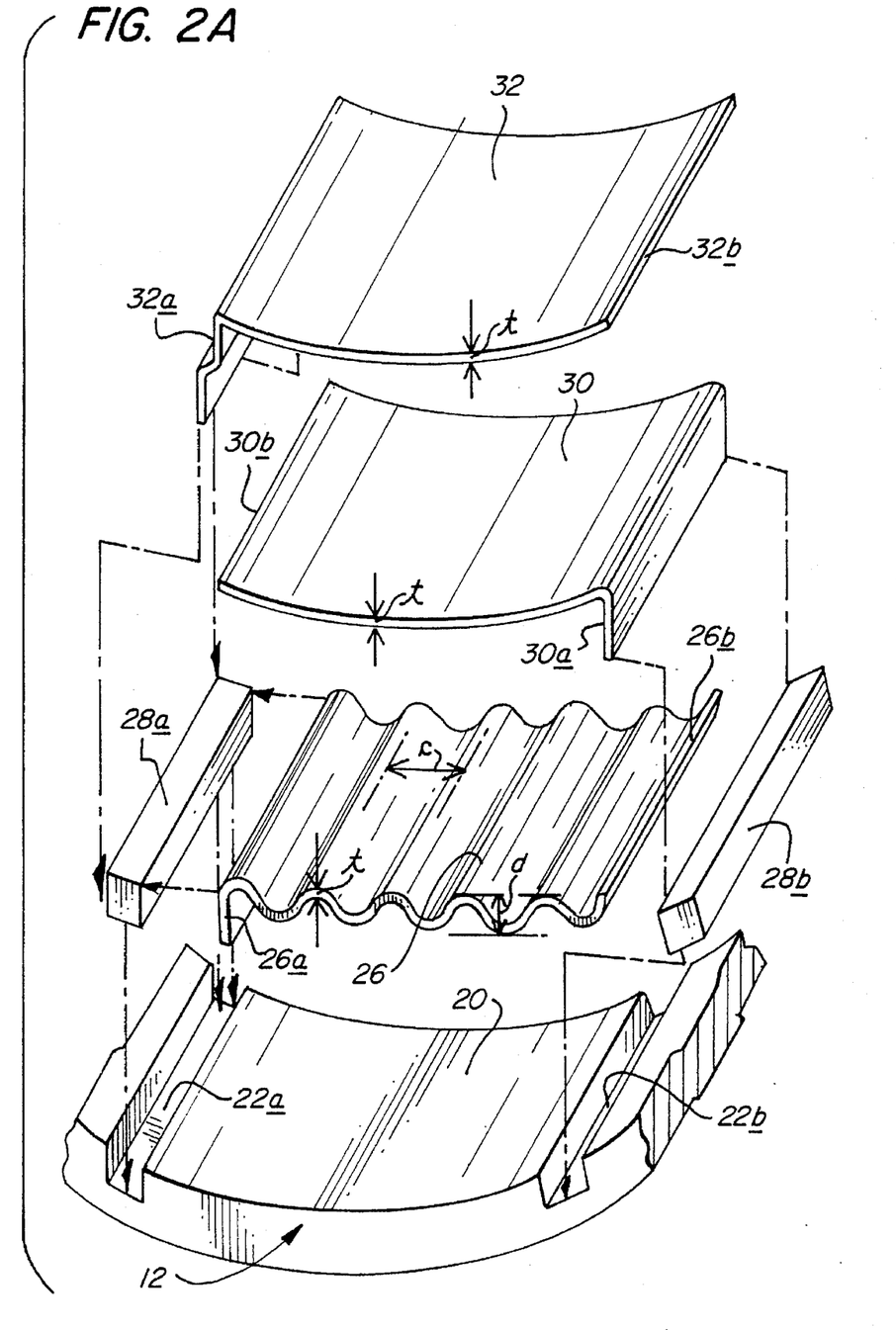
FIG. 2A is a perspective, exploded view, enlarged with respect to FIG. 2, of one of the sub-assemblies of FIG. 2 and the segment of the retaining member in which the sub-assembly is mounted.

Each foil sub-assembly 24 of FIG. 2 comprises a spring foil 26, a contact foil 30 and an inner foil 32. In the illustrated embodiment of FIGS. 1, 2, and 2A, spring foil 26 is corrugated, the corrugation crests and troughs running parallel to the longitudinal axis of retaining member 12. As best seen with reference to FIGS. 2 and 2A, a proximal terminal edge 26a (FIG. 2A) of spring foil 26 is received within keyway 22a wherein it is affixed, as by spot welding or by any other suitable means, to a mounting bar 28a which extends through keyway 22a. The opposite edge of spring foil 26 comprises a distal terminal edge 26b which is terminated adjacent to keyway 22b. (As used herein and in the claims, the terms "proximal" and "distal" have their usual meanings, although usually employed in biology wherein "distal" refers to that portion of a member farthest removed from the point of attachment of the member to another body, and "proximal" refers to that point of the member closest to the point of such attachment.)

A contact foil 30 has its proximal edge 30a (FIG. 2A) affixed to mounting bar 28b for affixation to retaining member 12 in keyway 22b, which is a keyway adjacent to keyway 22a. The distal edge 30b of contact foil 30 terminates adjacent to keyway 22a. Sub-assembly 24 is completed by an inner foil 32 having a proximal edge 32a affixed to mounting bar 28a within keyway 22a, and a distal edge 32b which terminates at keyway 22b. The remaining foil sub-assemblies are identical to the one described.

Contact foil 30 and inner foil 32 generally comprise compliant foils which will tend to flatten along spring foil 26 adjacent to inner surface 20 under the influence of rotation of rotatable shaft 16 (FIG. 1). The Figures are all schematic in that the radial thickness of both the foils from which the foil assembly is made, and the radial spacing between foils, as well as the depth of the corrugations in the spring foils, are somewhat exaggerated in the drawings for purposes of clarity of illustration. Typical actual dimensions for the foils would be, for a two-inch (5.1 centimeter) diameter bearing, a foil thickness (dimensions t in FIG. 2A) for the spring foil 26, contact foil 30 and inner foil 32, of about 3 to 3.5 mils each. (In contrast, the thickness of prior art foils is typically about 6 to 8 mils resulting in relatively rigid foils. The rigidity of the foils is a function of the cube of the dimension t.) The spring foil 26 typically has a corrugation depth (dimension d in FIG. 2A) of about 15 to 18 mils and a circumferential crest-to-crest (or trough-to-trough) distance (dimension c in FIG. 2A) of about 15 to 18 mils. For the above-described typical two-inch diameter bearing, the preform radius of the cylindrical shaped foil assembly 18 would be less than the radius of the cylindrical opening 14 by only about 21 to 25 mils, which is the sum of the thicknesses (d plus t plus t in FIG. 2A) of foils 26, 30 and 32. It is typical of the construction of the present invention, described in more detail below, that the inner circumference of the foil assembly 18, defined in the embodiment illustrated in FIG. 2A by the inner foil layer provided by cooperation of the five inner foils 32, will be only slightly smaller than the inside diameter of cylindrical opening 14. The relatively large inside diameter of foil assembly 18 reduces the strength of the gripping action of foil assembly 18 on rotatable shaft 16 (FIG. 1) and therefore reduces the required start-up torque.

When rotatable shaft 16 is inserted into retaining member 12 and rotated at high speed, the highly pressurized fluid film formed between the exterior surface of rotatable shaft 16 and foil assembly 18 will tend to flatten foil assembly 18 and cause some "sliding travel" of the foils as they are flattened and stretched by the action of the shaft and the pressurized fluid film, the sliding travel being, as is well-known in the art, in the direction moving from the fixed proximal edge of the foil towards the free, distal edge of the foil. Thus, with reference to FIG. 2, it will be observed that the sliding travel of spring foil 26 is in the rotational direction which is opposite to the direction of sliding travel of contact foil 30, and the rotational direction of sliding travel of inner foil 32 is opposite to that of the sliding travel of contact foil 30. The direction of sliding travel of spring foil 26, contact foil 30 and inner foil 32 is shown by the respective arrows 26t, 30t and 32t in FIG. 2. It will be appreciated that adjacent foils 26, 30 and 32 therefore travel and rub against each other in respective opposite directions; that is, the sliding travel of each foil is in the rotational direction opposite to the sliding travel of the foil adjacent to it. The relative movement between any two adjacent foils is therefore the sum of the sliding travel of the two adjacent foils. The increased relative sliding travel of adjacent foils, as compared to the sliding travel which would be attained if adjacent foils underwent sliding travel in the same rotational direction, provides enhanced coulomb damping of the shaft.

As is well-known in the art, suitable coatings may be applied to one or more surfaces of the foils to help control the desired degree of friction between adjacent rubbing foils and hence the desired degree of damping.

Any suitable means may be employed to prevent the foil assembly 18 from longitudinally sliding out of the keyways 22. Thus, at each end of the retaining member 12 the keyways may be covered by a small plate or other retaining means affixed to end face 34 (FIG. 2) and the corresponding end face (not shown in the drawings) at the opposite longitudinal end of retaining member 12. Such covers or retaining means may be affixed by screws or by any other suitable device. In the construction shown in FIGS. 1, 1A and 2, it will be noted that end face 34 is recessed under end rim 36 to provide a slot within which an annular member, such as metal O-ring 38, only a partial cross-sectional view of which is shown (in FIG. 1A), may be inserted within the slot formed by the undercutting of end face 34. Another metal O-ring identical to O-ring 38 is inserted at the other end (not shown) of retaining member 12.

Rotatable shaft 16 may, as indicated by the unnumbered arrows in FIG. 1 and the arrow R in FIG. 2, be rotated in either direction. However, with the construction of FIG. 2, rotatable shaft 16 is preferably rotated in the counter-clockwise direction in FIG. 2.

A significant advantage accrues from having each foil sub-assembly subtend only a portion, less than all, of the 360-degree path of rotational travel about inner surface 20. As will be appreciated by those skilled in the art, it is necessary to maintain extremely fine tolerances of the manufacture of foils which extend for substantially the full 360-degrees of rotation about the inner surface of the retaining member. Such fine tolerances must be maintained in order to assure that an extremely small and carefully controlled annular space is formed between the generally cylindrical foil assembly and the exterior surface of a shaft such as rotatable shaft 16 of FIG. 1. The maintenance of such fine tolerances in foils which extend for substantially the entire 360-degree path of rotation of the retaining member 12 is extremely difficult, requires extensive hand work and incurs very high manufacturing costs. Manufacturing foils and foil sub-assemblies which, in accordance with an aspect of the present invention, subtend only a limited portion of the 360-degree path of travel, is much easier and far less expensive. The relatively short lengths of foil are both easier to manufacture and the tolerances may be greater as compared to manufacturing a length of foil which has to wrap around the full 360-degree path of travel. Such relatively short lengths of foil can readily be manufactured by automated machinery.

Figure 3:
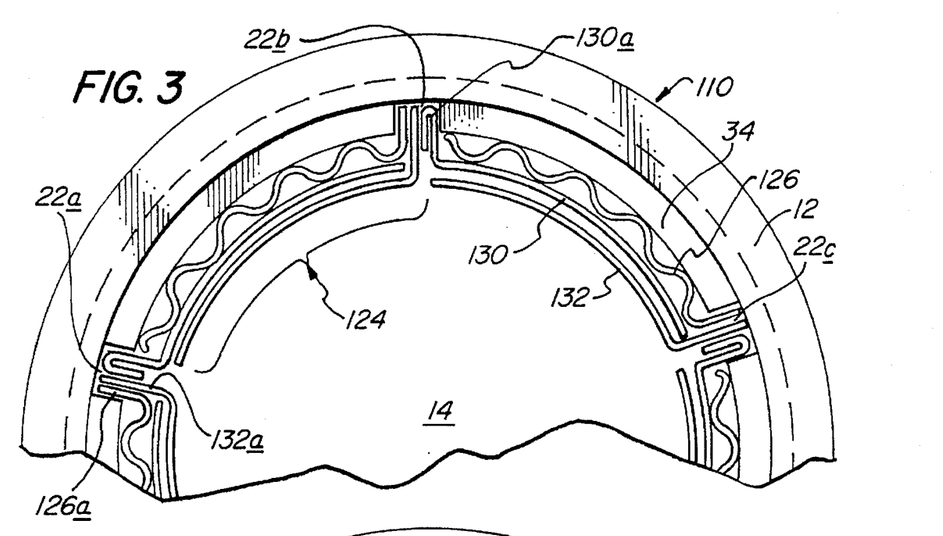
FIG. 3 is a partial schematic end view of a hydrodynamic bearing comprising yet another embodiment of the present invention.

Referring now to FIG. 3 there is illustrated another embodiment of the invention comprising a hydrodynamic fluid film bearing 110 comprised of a retaining member 12, which is identical to that of the embodiments of FIGS. 1–2A, and in which other parts identical to those of the embodiment of FIGS. 1–2A are numbered identically thereto. The embodiment of FIG. 3 differs from that of FIG. 2 in that the mounting bars 28a–28e of FIG. 2 are omitted and foil sub-assemblies 124 are mounted within the keyways (only keyways 22a, 22b and 22c are shown in the partial view of FIG. 3) by providing at least one of the foils of each foil sub-assembly 124 with a hooked construction at the proximal edge thereof. In the embodiment of FIG. 3, the proximal edges 130a of contact foils 130 are of such hook construction. The sub-assemblies 124 comprise a spring foil 126, a contact foil 130 and an inner foil 132 and the proximal edges 126a of spring foils 126 and the proximal edges 132a of inner foils 132 are bent at approximately a 90 degree angle from the major surfaces of the respective foils. The proximal edges of each of the foils are inserted into a corresponding one of the keyways 22a, 22b, etc. and the dimensions of the keyways and of the proximal edges of the foils are selected so that the hook-shaped proximal edges 130a of contact foils 130 are compressed sufficiently within the keyways to help retain the foils in place. The use of an end covering such as metal O-ring 38 of FIG. 1A and the close fit provided by the insertion of a rotatable shaft such as rotatable shaft 16 of FIG. 1, within cylindrical opening 14 cooperate with the hook construction and key slots to retain foil sub-assemblies 124 in place.

Figure 3A:
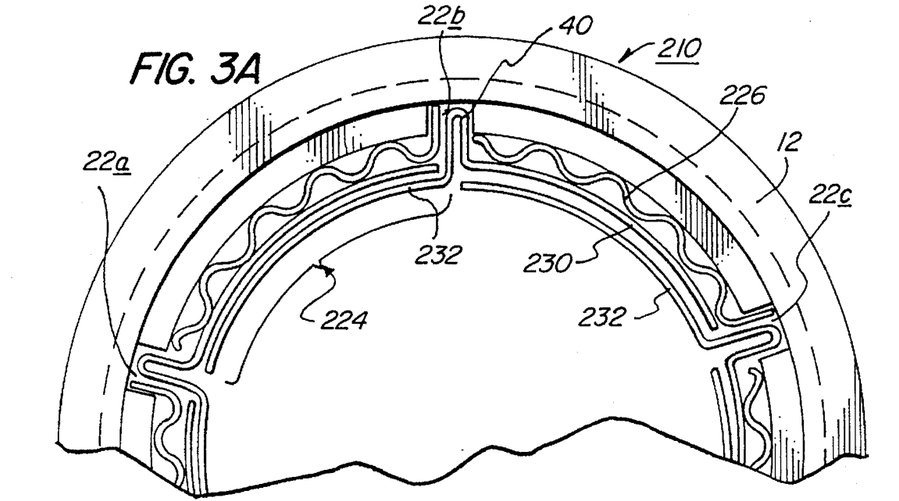
FIG. 3A is a view corresponding to FIG. 3 of still another embodiment of the present invention.

FIG. 3A illustrates yet another embodiment of the present invention in which, as in FIG. 3, elements identical to those of FIG. 2 are identically numbered thereto. FIG. 3A illustrates a hydrodynamic fluid film bearing 210 in which each foil sub-assembly 224 is comprised of a spring foil 226, a contact foil 230 and an inner foil 232. In this embodiment, the contact foil 230 of one sub-assembly 224 and the inner foil 232 of an adjacent foil sub-assembly 224 are comprised of a unitary foil having a return-bend portion 40 which serves the function of helping to retain the foil sub-assemblies 224 in place within their associated keyways (only keyways 22a, 22b and 22c are shown in FIG. 3A). The unitary foil 230, 232 thus has its proximal edge, defined in the illustrated embodiment by return-bend portion 40, at its center.

Figures 1A, 4A:
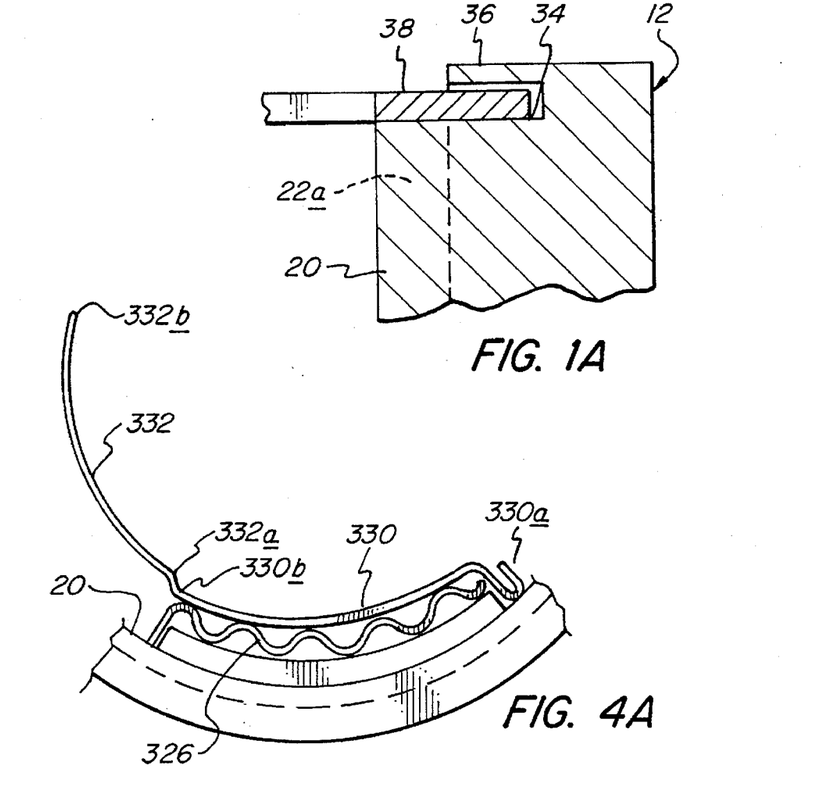
FIG. 1A is a partial schematic view, enlarged with respect to FIG. 1, taken along line A—A of FIG. 1.
FIG. 4A shows the structure of FIG. 4 broken away to show but a single spring foil and compliant foil and an associated segment of the retaining member.
Figure 4:
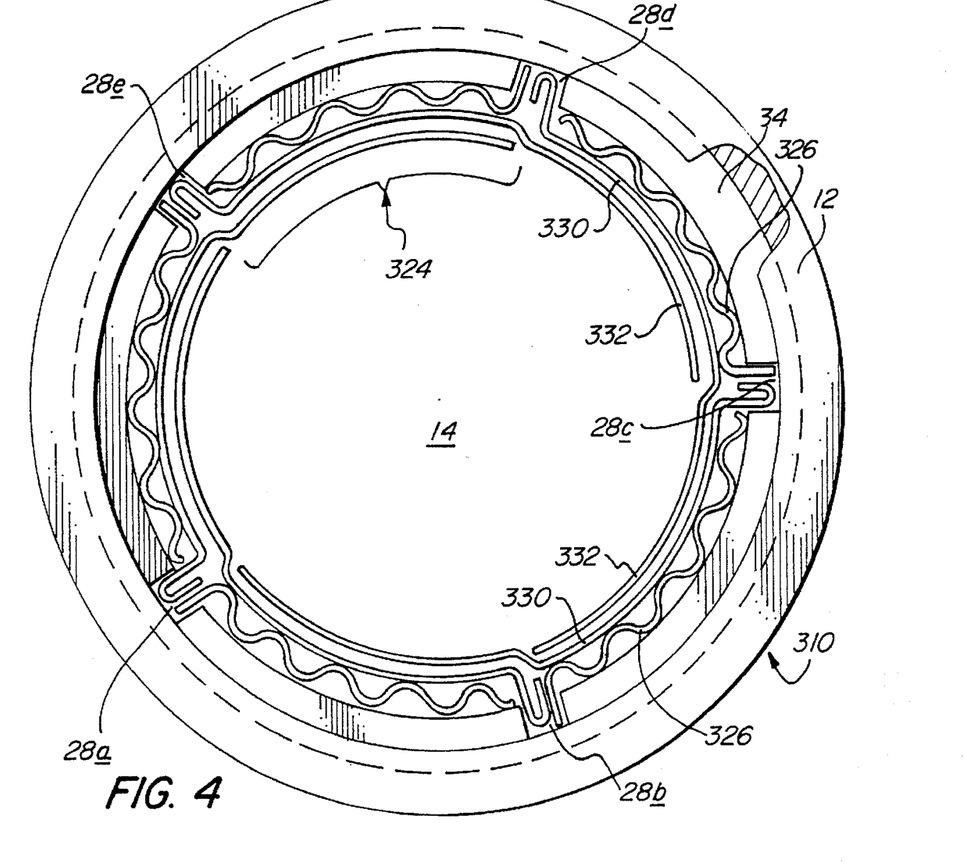
FIG. 4 is a schematic end view, with a part broken away, of a hydrodynamic bearing comprising still another embodiment of the present invention.

Referring now to FIGS. 4 and 4A there is shown yet another embodiment of the present invention in which parts identical to the embodiment illustrated in FIG. 2 are identically numbered thereto. FIG. 4 shows a hydrodynamic fluid film bearing 310 fitted with five foil sub-assemblies 324, each comprising a spring foil 326, a contact foil 330 and an inner foil 332. As best seen in FIG. 4A, in this embodiment, the contact foil 330 of a given foil sub-assembly 324 (FIG. 4) is formed of a unitary foil which also provides the inner foil 332 of the next adjacent foil sub-assembly 324. In this embodiment, the proximal edge 330a of contact foil 330 is formed in a hook-shaped configuration and, as is clearly shown in FIG. 4A, the distal edge 330b of contact foil 330 is adjacent to and connected to the proximal edge 332a of inner foil 332. The unitary foil comprised of contact foil 330 and inner foil 332 is at the free edge of the unitary foil, i.e., at the distal edge 332b of inner foil 332. It will thus be appreciated that in some embodiments, a proximal or distal "edge" may occur at an intermediate portion, e.g., at about the center, of a unitary foil.

Figure 5:
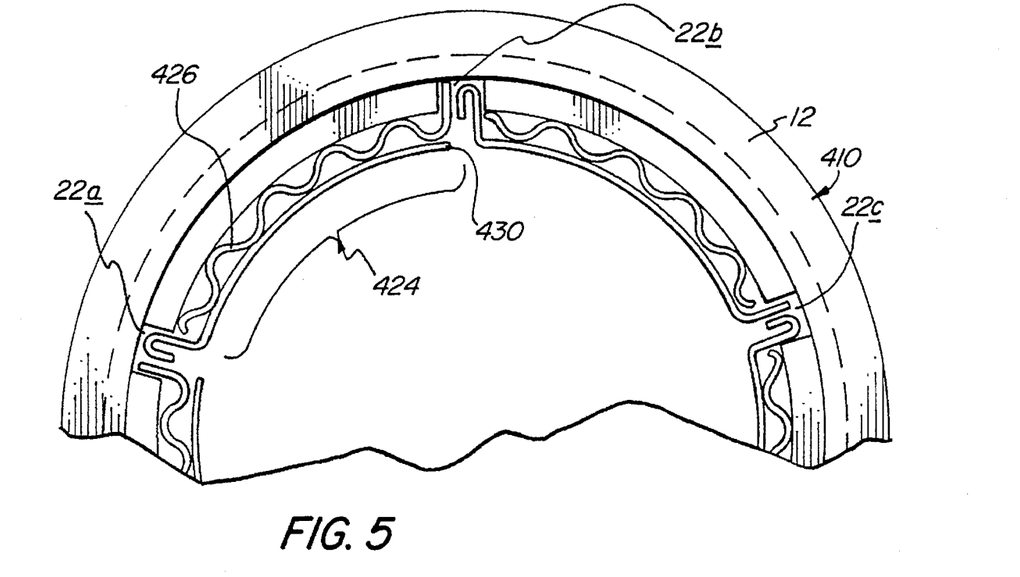
FIG. 5 is a view corresponding to that of FIG. 3 of still another embodiment of the present invention.

Referring now to FIG. 5, there is shown a hydrodynamic fluid film bearing 410, illustrating yet another embodiment of the invention which is substantially identical to the embodiment illustrated in FIG. 3, except that each foil sub-assembly 424 comprises only a spring foil 426 and a contact foil 430. In this embodiment, an inner foil corresponding to inner foil 132 of the FIG. 3 embodiment is omitted.

The specific embodiments of the invention illustrated in FIGS. 1–5 all concern bearings having cylindrical shaft-receiving openings, such as opening 14 of FIG. 1. Such bearings are well-suited for supporting a load imposed transversely of the longitudinal axis of the shaft supported by the bearing. The present invention, however, also encompasses thrust bearings, which are well-suited for supporting not only loads imposed transversely of the supported shaft, but loads imposed axially along the supported shaft towards the thrust bearing. Such thrust bearings made in accordance with the present invention may be constructed similarly or identically to the embodiments of FIGS. 1–5 except that the opening corresponding to opening 14 of FIG. 1 is of conical, e.g., frusto-conical, configuration, i.e., the opening has a circular cross section which is of diminishing diameter as sensed moving in the direction in which the axial load is imposed on the shaft supported by the bearing. The foil assembly is similarly of conical, e.g., frusto-conical, configuration instead of constant diameter but may otherwise be similar or identical to the foil assemblies of the FIGS. 1–5 embodiments.

Figure 6:
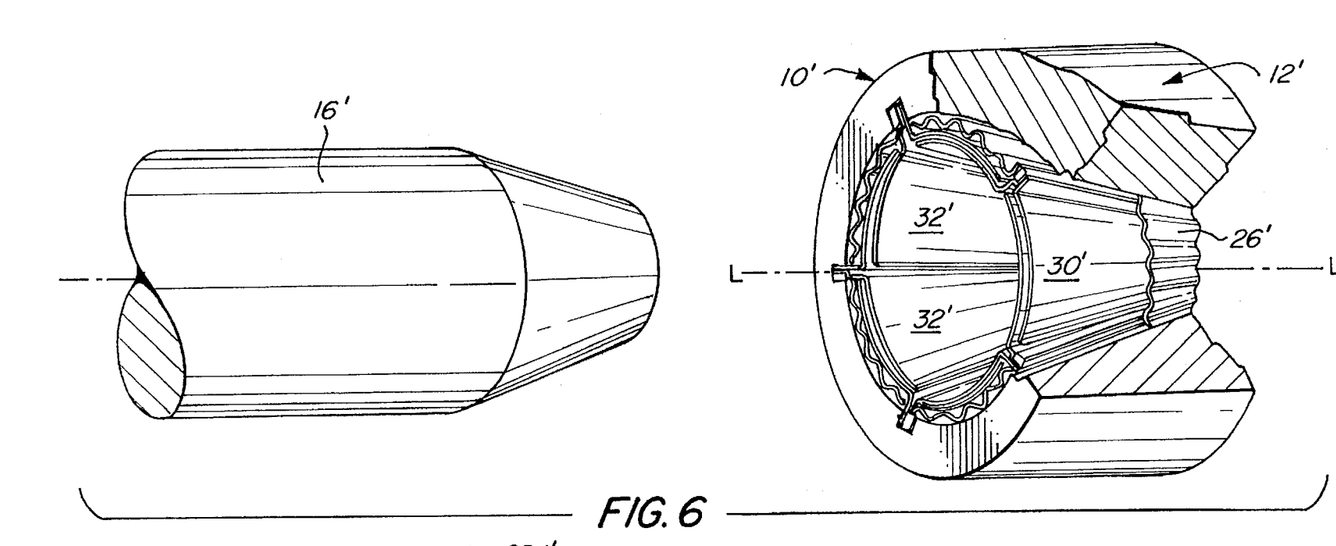
FIG. 6 is a partial schematic exploded view, with parts broken away, of a hydrodynamic thrust bearing in accordance with yet another embodiment of the present invention, and a rotatable shaft to be received therein.
Figure 6A:
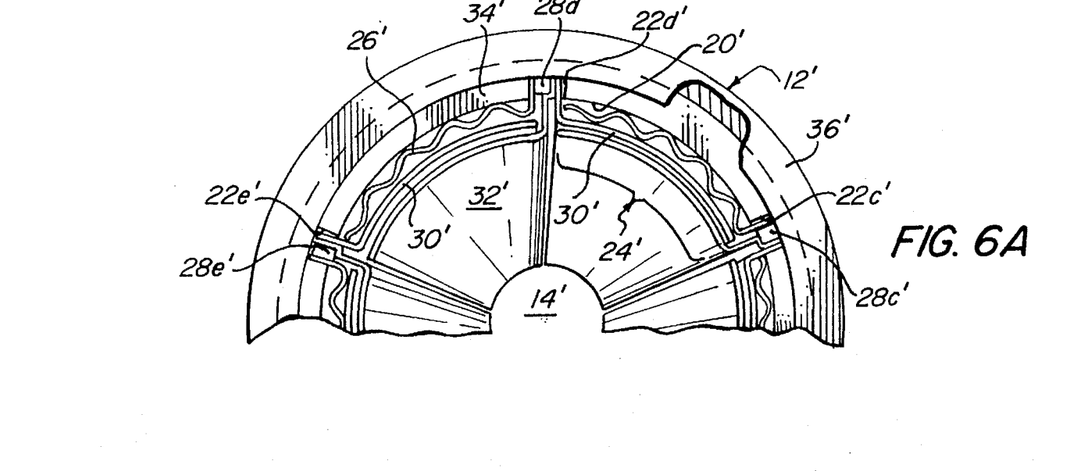
FIG. 6A is a schematic partial end view, with parts broken away and enlarged with respect to FIG. 6, of the larger diameter end of the bearing of FIG. 6.

FIGS. 6 and 6A illustrate such a conical thrust bearing in accordance with another embodiment of the present invention wherein parts which correspond to those of the embodiment of FIGS. 1 and 2 are identically thereto numbered except for the addition of a prime indicator. Thus, FIG. 6 shows a conical, hydrodynamic fluid film bearing 10' comprising a retaining member 12' which defines a conical opening 14' within which a rotatable shaft 16' (broken away in FIG. 6) has a conical-shaped end 16a' which is received for rotation within bearing 10'. A generally conical-shaped foil assembly 18' (seen in FIG. 6 and only partially shown in FIG. 6A) lines the inner surface 20' of retaining member 12'. A plurality of circumferentially spaced-apart keyways (only keyways 22c', 22d' and 22e' being visible in FIG. 6A) are formed in inner surface 20' and extend at an angle to the longitudinal axis L—L (FIG. 6) of retaining member 12'. Conical versions of the foil configurations of FIGS. 2 through 5 are useable in the conical bearing 10' of FIG. 6.

Foil assembly 18' is comprised of a plurality of foil sub-assemblies 24' (FIG. 6A) corresponding to foil sub-assemblies 24 of FIG. 2. At the plane of any given cross section taken perpendicularly to longitudinal axis L—L of FIG. 6, the foil sub-assemblies of the fluid film bearing 10 would look identical to the foil sub-assemblies 24 of FIG. 2. Thus, as seen in FIG. 6A, the foil assembly 18' is comprised of a plurality of foil sub-assemblies, each comprising a spring foil 26', a contact foil 30' and an inner foil 32'. Each foil sub-assembly, like those of the embodiment of FIGS. 1 and 2, subtends a rotational segment, less than all, of the inner surface 20' and the mounting bars (only mounting bars 28c', 28d' and 28e' being visible in FIG. 6A) and the crests and troughs of the corrugation crests and troughs extend along the surface of a truncated right-angle cone. In short, except for the conical configuration of the retaining member 12' and foil assembly 18', the configuration of the thrust-bearing embodiments of the invention is identical or similar to that of the cylindrical bearings embodiment of the invention, e.g., those illustrated in FIGS. 1–5. Accordingly, a detailed description of the components of the embodiment of FIGS. 6 and 6A need not be repeated.

Although the present invention has been described in detail with respect to specific preferred embodiments thereof, various modifications thereto lie within the spirit and scope of the invention and the claims.

What is claimed is:

1. A hydrodynamic fluid film bearing comprising:

a retaining member having an inner surface which defines a shaft opening within which a rotatable shaft is receivable for rotation; and a foil assembly affixed to and lining the inner surface and comprising a plurality of foil sub-assemblies, the foil sub-assemblies each subtending a rotational segment, less than all, of the inner surface and comprising (i) compliant flat contact foils sandwiched between (ii) spring foils disposed radially outwardly of their associated contact foils and (iii) compliant flat inner foils disposed radially inwardly of their associated contact foils, the spring foils, the contact foils and the inner foils being affixed to the retaining member with the contact foils disposed along the inner surface in the opposite-facing rotational direction from that in which the spring foils and the inner foils are disposed along the inner surface, whereby sliding travel of the spring foils and the inner foils is in the opposite rotational direction of sliding travel of the contact foils sandwiched therebetween.

2. The bearing of claim 1 wherein the inner surface and the foil assembly are of cylindrical configuration.

3. The bearing of claim 1 wherein the inner surface and the foil assembly are of conical configuration.

4. The bearing of claim 1 wherein the spring foils have respective terminal proximal edges affixed to the retaining member and respective, opposite terminal distal edges facing in a first rotational direction along the inner surface, and the contact foils are affixed to the retaining member and have respective distal edges facing in a second rotational direction opposite to the first rotational direction, whereby sliding travel of the spring foils is in the first rotational direction and sliding travel of the contact foils is in the second, opposite rotational direction.

5. The bearing of claim 1 including a plurality of circumferentially spaced-apart keyways formed in the inner surface and wherein the inner, contact and spring foils have respective proximal edges opposite their distal edges and the respective proximal edges are affixed in associated keyways.

6. The bearing of claim 1 wherein the contact foil of a given sub-assembly overlaps substantially the entire length of the spring foil of the given sub-assembly, and the inner foil of the given sub-assembly overlaps substantially the entire length of the contact foil of the given sub-assembly.

7. The bearing of claim 1 wherein a compliant unitary foil is secured to the retaining member at an intermediate portion thereof, to provide the compliant contact foil of one foil sub-assembly and the compliant inner foil of an adjacent foil sub-assembly, each compliant foil having a distal edge facing in respective opposite directions of rotation.

8. The bearing of claim 7 wherein the contact foil comprises one arm of each compliant foil and the inner foil comprises the other arm thereof, with the inner foil of a given compliant foil overlapping the contact foil of the adjacent compliant foil, and each inner foil is disposed in the rotational direction which is opposite to that of each contact foil and the same as that of each spring foil, whereby the respective contact foils cooperate to provide a radially outer compliant foil layer and the respective inner foils cooperate to provide a radially inner compliant foil layer.

9. The bearing of any one of claims 1, 2 or 3 further comprising a rotatable shaft received within the shaft opening to define between the shaft and the foil assembly an annular space dimensioned and configured so that a pressurized fluid film layer capable of supporting the shaft is maintainable therewithin.

10. The bearing of any one of claims 1, 2 or 3 wherein each foil segment subtends a rotational segment of the inner surface of not more than about 120 degrees of rotation.

11. The bearing of claim 10 wherein each foil segment subtends a rotational segment of the inner surface of from about 45 to 120 degrees of rotation.

12. The bearing of any one of claims 1, 2 or 3 wherein the retaining member has a longitudinal axis and the spring foil is corrugated, the corrugations being disposed substantially parallel to the longitudinal axis of the retaining member.

13. A hydrodynamic fluid film bearing comprising:

a retaining member having an inner surface which defines a shaft opening within which a rotatable shaft is receivable for rotation; and a foil assembly affixed to and lining the inner surface and comprising a plurality of foil sub-assemblies, the foil sub-assemblies each subtending a rotational segment, less than all, of the inner surface and comprising (i) compliant contact foils sandwiched between (ii) spring foils disposed radially outwardly of their associated contact foils and (iii) compliant inner foils disposed radially inwardly of their associated contact foils, the spring foils and the contact foils being affixed to the retaining member in respective opposite-facing rotational directions along the inner surface whereby sliding travel of the spring foils is in the opposite rotational direction of sliding travel of the contact foils, and wherein the compliant contact foil of one foil sub-assembly is integral with the compliant inner foil of an adjacent foil sub-assembly, thereby constituting a unitary compliant foil, the unitary foil being secured to the retaining member at an intermediate portion thereof; each unitary compliant foil terminating in respective opposite distal edges each facing in respective opposite directions of rotation.

14. The bearing of claim 13 wherein the contact foil comprises one arm of each compliant foil and the inner foil comprises the other arm thereof, with the inner foil of a given compliant foil overlapping the contact foil of the adjacent compliant foil, and each inner foil is disposed in the rotational direction which is opposite to that of each contact foil and the same as that of each spring foil, whereby the respective contact foils cooperate to provide a radially outer compliant foil layer and the respective inner foils cooperate to provide a radially inner compliant foil layer.

15. The bearing of claim 13 including a plurality of circumferentially spaced-apart keyways formed in the inner surface and wherein the inner, contact and spring foils have respective proximal edges opposite their distal edges and the respective proximal edges are affixed in associated keyway.

16. The bearing of any one of claims 13, 14 or 15 further comprising a rotatable shaft received within the shaft opening to define between the shaft and the foil assembly an annular space dimensioned and configured so that a pressurized fluid film layer capable of supporting the shaft is maintainable therewithin.

17. The bearing of any one of claims 13, 14 or 15 wherein each foil segment subtends a rotational segment of the inner surface of not more than about 120 degrees of rotation.

18. The bearing of claim 14 wherein each foil segment subtends a rotational segment of the inner surface of from about 45 to 120 degrees of rotation.

19. The bearing of any one of claims 13, 14 or 15 wherein the retaining member has a longitudinal axis and the spring foil is corrugated, the corrugations being disposed substantially parallel to the longitudinal axis of the retaining member.

* * * * *

UNITED STATES PATENT AND TRADEMARK OFFICE
CERTIFICATE OF CORRECTION

PATENT NO.  : 5,634,723
DATED       : June 3, 1997
INVENTOR(S) : Giridhari L. Agrawal It is certified that error appears in the above-indentified patent and that said Letters Patent is hereby corrected as shown below:

In claim 18, column 12, line 6, replace "claim 14" with --claim 17-- in order to change the dependency of the claim from claim 14 to claim 17.

Signed and Sealed this

Twenty-first Day of October 1997

*Attest:*

BRUCE LEHMAN

*Attesting Officer*    *Commissioner of Patents and Trademarks*